(12) United States Patent
Brelin et al.

(10) Patent No.: US 6,810,446 B1
(45) Date of Patent: Oct. 26, 2004

(54) SYSTEM AND METHOD FOR NAVIGATING AND DELETING DESCRIPTORS

(75) Inventors: Jon Ebbe Brelin, San Jose, CA (US); Hisato Shima, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 687 days.

(21) Appl. No.: 09/607,768

(22) Filed: Jun. 30, 2000

Related U.S. Application Data

(60) Provisional application No. 60/195,357, filed on Mar. 31, 2000.

(51) Int. Cl.[7] .................................................. G06F 3/00
(52) U.S. Cl. .............................. 710/36; 710/30; 710/72
(58) Field of Search .............................. 710/30, 36, 72; 707/3

(56) References Cited

U.S. PATENT DOCUMENTS

| | | | | |
|---|---|---|---|---|
| 5,101,494 A | * | 3/1992 | Bilski et al. ................ | 395/700 |
| 5,359,725 A | * | 10/1994 | Garcia et al. ................ | 395/500 |
| 5,809,331 A | * | 9/1998 | Staats et al. ................ | 395/830 |
| 5,828,788 A | * | 10/1998 | Chiang et al. .............. | 382/239 |
| 6,219,766 B1 | * | 4/2001 | Cadden ....................... | 711/154 |
| 6,460,030 B1 | * | 10/2002 | Ludtke .......................... | 707/3 |

OTHER PUBLICATIONS

IEEE 1394, www.webopedia.com.*

TA Document 1999025 "AV/C General–Descriptor and Info Block Mechanism" Draft 0.2:212, 1394 Trade Association, Santa Clara, CA.

* cited by examiner

*Primary Examiner*—Fritz Fleming
*Assistant Examiner*—Alan Chen
(74) *Attorney, Agent, or Firm*—Blakely, Sokoloff, Taylor & Zafman LLP

(57) ABSTRACT

A system comprising at least two devices coupled to a bus wherein at least one device contains a descriptor hierarchy. A data structure has a descriptor specifier which specifies an entry by a list identifier and an object identifier.

26 Claims, 18 Drawing Sheets

| Address Offset | Contents |
|---|---|
| $00_{16}$ | descriptor_specifier_type = $23_{16}$ |
| $01_{16}$ | list_ID |
| ⋮ | |
| ⋮ | |
| ⋮ | object_ID |
| ⋮ | |
| ⋮ | |

FIG. 3

| Address Offset | Contents | |
|---|---|---|
| $00_{16}$ | compound_length | 610 |
| $01_{16}$ | info_block_type = 00 08$_{16}$ (parent descriptor specifier) | 620 |
| ... | primary_fields_length | 630 |
| ... | descriptor_specifier_type = 23$_{16}$ | 640 |
| ... | list_ID | 650 |
| ... | object_ID | 660 |

| Address | Length, bytes | External Read/ Write | Static/ Dynamic | Contents |
|---|---|---|---|---|
| 0000₁₆ | 2 | R | D | list_descriptor_length |
| 0001₁₈ | 1 | R | S | list_type |
| 0002₁₆ | >=1 | R | D | attributes |
| ... | 2 | R | D | list_specific_information_length = i |
| ... | i | | D | list_specific_information... |
| ... | 2 | R | D | number_of_entry_descriptors = n |
| ... | see² | | D | entry_descriptor[0]... |
| ... | | | | .. |
| ... | see² | | D | entry_descriptor[n-1]... |
| ... | | | | extended_information  810 |

FIG. 7

Placing the new descriptor specifier for the parent descriptor at the end (e.g. extended_information field) of the root list descriptor or the child list descriptor when the list descriptor is created.
910

Reading the descriptor specifier for the parent descriptor, located in the extended_information field of the root list descriptor or the child list descriptor, is used to determine the parent entry for the child list or the subunit identifier for the root list.
920

Controller issues the command using the descriptor_specifier for opening its parent entry.
930

FIG. 9

| bytes | msb | | | | | lsb |
|---|---|---|---|---|---|---|
| | DELETE DESCRIPTOR (XX$_{16}$) | | | | | |
| 1 | opcode | | | | | |
| v | operand[0] descriptor_specifier | | | | | |
| | operand[1] | | | | | |
| 1 | result | | | | | |
| 1 | number_of_undeleted_descriptors | | | | | |
| v | descriptor_specifier [1] | | | | | |
| 2 | opener_node_id [1] | | | | | |
| .. | .. | | | | | |
| v | descriptor_specifier [n] | | | | | |
| 2 | opener_node_id [n] | | | | | |

FIG. 15

SYSTEM AND METHOD FOR NAVIGATING AND DELETING DESCRIPTORS

This application claims the benefit of the earlier filing date of co-pending provisional application of Jon Ebbe Brelin and Hisato Shima entitled, "System and Method for Accessing Navigating Descriptors," Serial No. 60/195,337, filed Mar. 31, 2000 and incorporated herein by reference.

BACKGROUND OF THE INVENTION

1. Field of the Invention

The present invention relates to data retrieval in audio, video or audio/video interconnected systems for home or office use and, more particularly, to a system and method for navigating a descriptor hierarchy within such systems.

2. Background

Data retrieval from a high speed serial bus such as an Institute of Electrical and Electronics Engineers (IEEE) 1394 standard serial bus, std 1394-1995, Standard For A High Performance Serial Bus, (Aug. 30, 1996) (hereinafter referred to as the "IEEE 1394 standard serial bus") incorporates unnecessary operations and burdens an audio video/control ("AV/C") protocol that uses the IEEE 1394 standard serial bus. One illustration of this problem relates to the IEEE 1394 standard serial bus that uses a controller device to navigate a descriptor hierarchy in a target device (also referred to herein as a data structure hierarchy) and the controller sends a command to, for example, a descriptor to open. An AV/C controller ("controller") is a device at a serial bus node that sends AV/C commands to control a remote AV/C device. A target's descriptor ("target") has defined fields used for sharing device information and which may be modified by any device. When navigating a descriptor hierarchy, a controller, using conventional AV/C commands, opens and reads a descriptor on a target device containing information. This information may pertain, for example, to a destination file.

Navigating a descriptor hierarchy involves a controller opening and reading descriptors that are arranged in a hierarchical format. Descriptors in a descriptor hierarchy may be read in a forward or in a backward approach. A forward approach involves opening and reading a descriptor to determine the next descriptor to open. A conventional backward approach generally involves the controller memorizing the descriptors it has opened, and reversing the forward navigation path.

To navigate descriptors, the controller sends an OPEN DESCRIPTOR command with a descriptor_specifier data structure specifying a list. Entry descriptors within the list may contain information about the next hierarchical list such as its child list. Using the READ DESCRIPTOR command, an entry's child list identifier (i.e. child_list_ID) is then returned to the controller and the next list which is a level below may be opened. Generally, there are two conventional approaches to refer to an entry descriptor in a list when issuing commands. First, descriptor_specifier $20_{16}$ may be used to specify an entry descriptor by the identifier of its list (i.e. list_ID) and then by its entry position. Second, another descriptor specifier such as descriptor_specifier $21_{16}$ may be used to specify an entry descriptor by its root list identifier (i.e. root_list_ID), its list_type (i.e. list_type), and then by its object identifier (i.e. object_ID).

There are numerous disadvantages to these conventional approaches. For example, some AV/C subunits on the IEEE 1394 standard serial bus are required to support specific entry descriptors by entry position. Other AV/C subunits are required to support descriptors by an object identifier. Consequently, controllers bear the burden of supporting both types of access methods depending upon the target that it is controlling.

Another disadvantage is that if a controller has access to the list identifier in which the entry exists, the controller is generally required to support specifying that entry by an entry position. Specifying the entry by an entry position can be problematic. For instance, a list generally contains a plurality of entries and if one of the middle entries is deleted, their positions shift. For the purpose of illustration, assume that a list contains five entries. If the third entry position, for example, is deleted, the fourth entry position and the fifth entry position move and become the new third and fourth entry positions. This causes a problem because invalid information may be supplied to a target by a controller that contains the old entry position.

Yet another disadvantage is that if an AV/C target uses the object identifier reference (i.e. a field in the entry that identifies the object for which the entry represents), the AV/C target may also specify an ambiguous entry since object identifiers are unique only within a particular list_type and there may be many lists in the target of the same list_type. This is also problematic since the list is already opened by a list identifier and the AV/C subunit then must support that same list with a redundant specification such as the list_type specification when using object_ID specification.

Another conventional approach for specifying descriptors in a descriptor hierarchy relates to the data that identifies the lists and entries in the descriptor hierarchy for navigation purposes. Presently, if a controller navigates a descriptor hierarchy in order to view hierarchical data, the controller navigates in a forward direction. The controller reads a descriptor and determines if any root lists or child lists exist. The controller may then open those lists. However, these lists typically lack information about their parent descriptor. In order to recall the parent descriptor identifier, the controller must track the descriptors that it has navigated by storing the identifications ("IDs") of the parent entry and child list descriptors within the storage device of the controller. However, other controllers may modify the descriptor hierarchy in a target device at any time causing the first controller to have erroneous data. It is therefore desirable to have a system of navigating a descriptor hierarchy that eliminates the redundancies, ambiguities, complexities and other disadvantages associated with the conventional approaches.

In addition to navigating descriptor hierarchies, conventional systems lack a straightforward way of deleting descriptors in a hierarchy. For example, generally two subfunctions in the WRITE DESCRIPTOR command defined in the AV/C documentation may be used to delete descriptor data. However, these two subfunctions do not account for the hierarchical nature of the descriptor structure. For instance, if the child_list_ID field in an entry is deleted using the WRITE DESCRIPTOR command, there is no indication in the command how the entry's child_list should be deleted. It is therefore also desirable to have a system and method in a descriptor hierarchy that defines how to delete descriptors under various conditions.

SUMMARY OF THE INVENTION

A method is disclosed for coupling a first device and a second device to a bus. Parent descriptor information blocks are placed into a descriptor hierarchy data structure for AV/C devices. The descriptor specifier specifies an entry by a list identifier and an object identifier. Additional features, embodiments, and benefits will be evident in view of the figures and detailed description presented herein.

BRIEF DESCRIPTION OF THE DRAWINGS

The present invention is illustrated by way of example and not limited in the figures of the accompanying drawings, in which like references indicate similar elements and in which:

FIG. 3 illustrates descriptor_specifier data structure used by controllers in AV/C descriptor commands and by targets in its descriptors;

FIG. 5 illustrates in one embodiment a parent descriptor info block for a child list that is to be placed in the list descriptor's extended information area;

FIG. 7 illustrates in one embodiment the list descriptor that may include parent entry descriptors;

FIG. 9 is a flow diagram of one embodiment for embedding information about the parent entry or SID within the list descriptor for backwards navigability.

FIG. 15 illustrates a response frame of the DELETE DESCRIPTOR command;

DETAILED DESCRIPTION

In one embodiment, a system is disclosed in which a device is coupled to another device that contains shared navigable information by a bus, such as a IEEE 1394 standard serial bus. A type of descriptor specifier is introduced which specifies an entry by its list_ID and then its object_ID. In this system, descriptor navigation information is entirely contained within the descriptor hierarchy allowing for a direct route in a backward direction when navigating the data within the descriptor hierarchy. This reduces the burden caused by multiple controller storage of navigation data.

In another embodiment, a parent descriptor information block is placed in both types of list descriptors. This allows a controller to navigate descriptors in a backward direction without having to store the list identifier of the list descriptors within the storage device of one or more controllers.

In yet another embodiment, a DELETE DESCRIPTOR is used for cascade deleting descriptors in a descriptor hierarchy.

In the following description, numerous specific details are set forth to provide a thorough understanding of the invention. However, it will be understood by one of ordinary skill in the art that the invention may be practiced without these specific details. In other instances, well known structures and techniques have not been shown in detail to avoid obscuring the invention.

Figure 1:
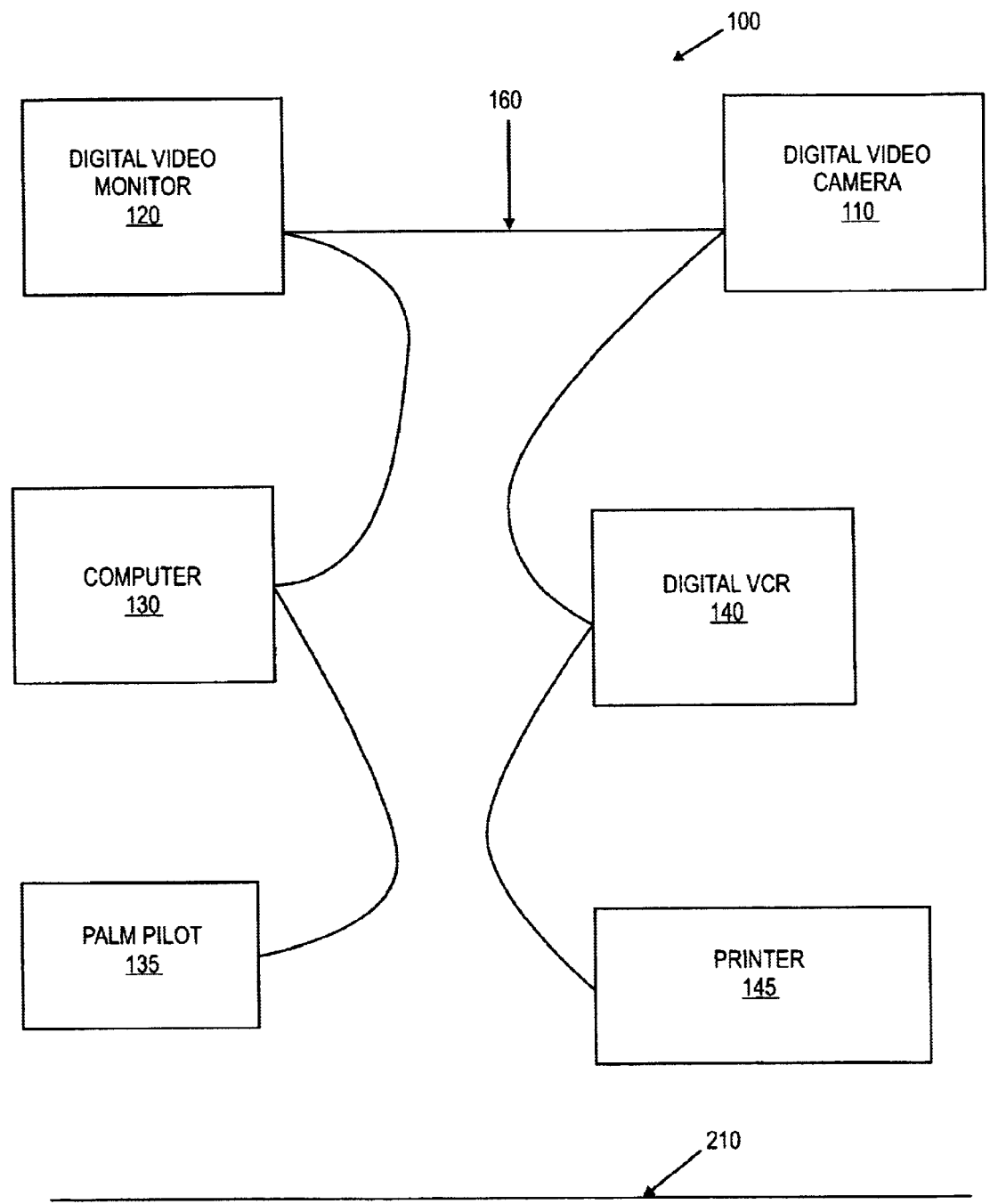
FIG. 1 is a block diagram of one embodiment for multimedia network including various consumer electronic devices coupled through a high speed serial bus.

FIG. 1 is a block diagram of one embodiment for multimedia network 100, including various consumer electronic devices coupled through a high speed serial bus 160. The high speed serial bus 160 may be, for example, an IEEE 1394 standard serial bus. In one embodiment, the multimedia network 100 may be located in one physical building, such as a home or an office. Multimedia network 100 may include digital video camera 110, digital video monitor 120, personal computer 130, palm pilot 135, digital video cassette recorder ("VCR") 140, and printer 145. High speed serial bus 160 supports communication of digital audio/video data and computer transmission data between the network devices. Digital video camera 110, digital VCR 140, printer 145, or any other consumer electronic device typically do not have direct Internet access whereas computer 130 and palm pilot 135 may be configured to have Internet access. Network 210 that includes networks such as an intranet or a global network such as the Internet, interfaces with computer 130 and palm pilot 135 through, for example, a telephone line (not shown) or wireless communication.

Figure 2:
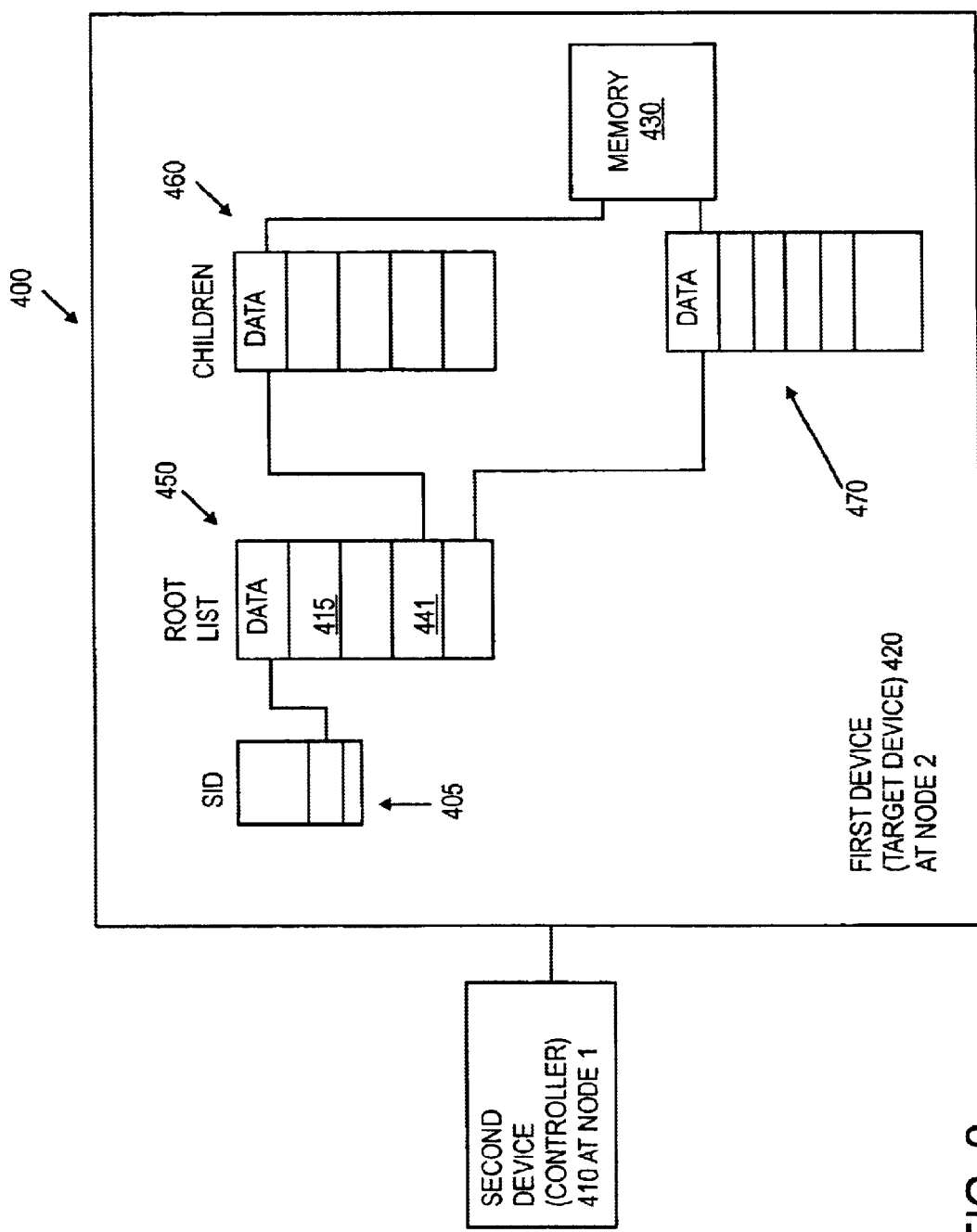
FIG. 2 is a block diagram of one embodiment of a controller AV/C device and a target AV/C device with a descriptor hierarchy residing in the target node of the IEEE 1394 standard serial high speed serial bus.

FIG. 2 is a block diagram of one embodiment of two AV/C devices such as computer 130 and camera 100 shown in FIG. 1 residing in two nodes of the IEEE 1394 standard serial bus. System 400 includes controller device (also referred to herein as a second device) 410 connected to a target device (also referred to herein as a first device) 420. Target device 420 may be digital video camera ("DVC"). Target device 420 includes storage 430 such as memory for storing data and several descriptors (data structures) 405, 450, 460, and 470. Data may be transferred to and from descriptors 405, 450, 460, and 470.

Each descriptor 405, 450, 460, and 470 has a structured data interface containing information pertaining to features of device 420. A child descriptor is to the right of its parent descriptor, and a parent descriptor is to the left of its child descriptor. The identification of a child descriptor is maintained within the parent descriptor. For forward navigation, controller 410 accesses subunit identifier descriptor ("SID") 405. Controller 410 uses the known descriptor_specifier type "0" representing the SID 405. Using SID 405, controller 410 can open a root list descriptor 450. Thereafter, child lists 460 and 470 (the child list is also referred to herein as the second list) can be opened by reading child_list_IDs in the parent entries in the root list 450.

In one embodiment, list descriptors 450, 460, and 470 each include entry descriptors with object_IDs. This allows controller 410 to access a variety of information from a target device 420 by using a single descriptor specifier type, as shown in FIG. 3, in a descriptor command such as a READ DESCRIPTOR. This descriptor specifier in a descriptor command specifies the list identifier and the object identifier for a unique entry descriptor. By including the list identifier and the object identifier, the descriptor command is used by controller 410 to access an entry. More specifically, controller 410 is able to open, read, or write the entry by specifying both the list identifier and the object identifier for that entry.

The result of using a descriptor specifier with a list identifier and an object identifier (i.e. list_ID, object_ID) for an entry descriptor is that the descriptor specification is more precise which allows high speed serial bus 160 to be more efficient than typical high speed serial buses. For example, AV/C subunits will no longer be required to support specifying descriptors by list_ID, entry_position and/or support specifying descriptors by root_list_ID, list_type, or object_ID which can result in an unreliable or an ambiguous specification. Additionally, contrary to typical techniques, by using an entry descriptor that includes both a list identifier and an object identifier, if an entry position is dynamically changed, the entry position still maintains its uniqueness. The techniques of the invention eliminate the need of designating and supporting the ambiguous identifier "list_type" by maintaining both an object identifier and a list identifier in the same descriptor specifier. Furthermore, a descriptor specifier having a list identifier and an object identifier is not ambiguous. Accordingly, less burden is placed on controller 410 such as computer 130 compared to conventional techniques when the descriptor specifier having a list identifier and an object identifier is used as a return path for navigating descriptor hierarchies.

Figure 4:
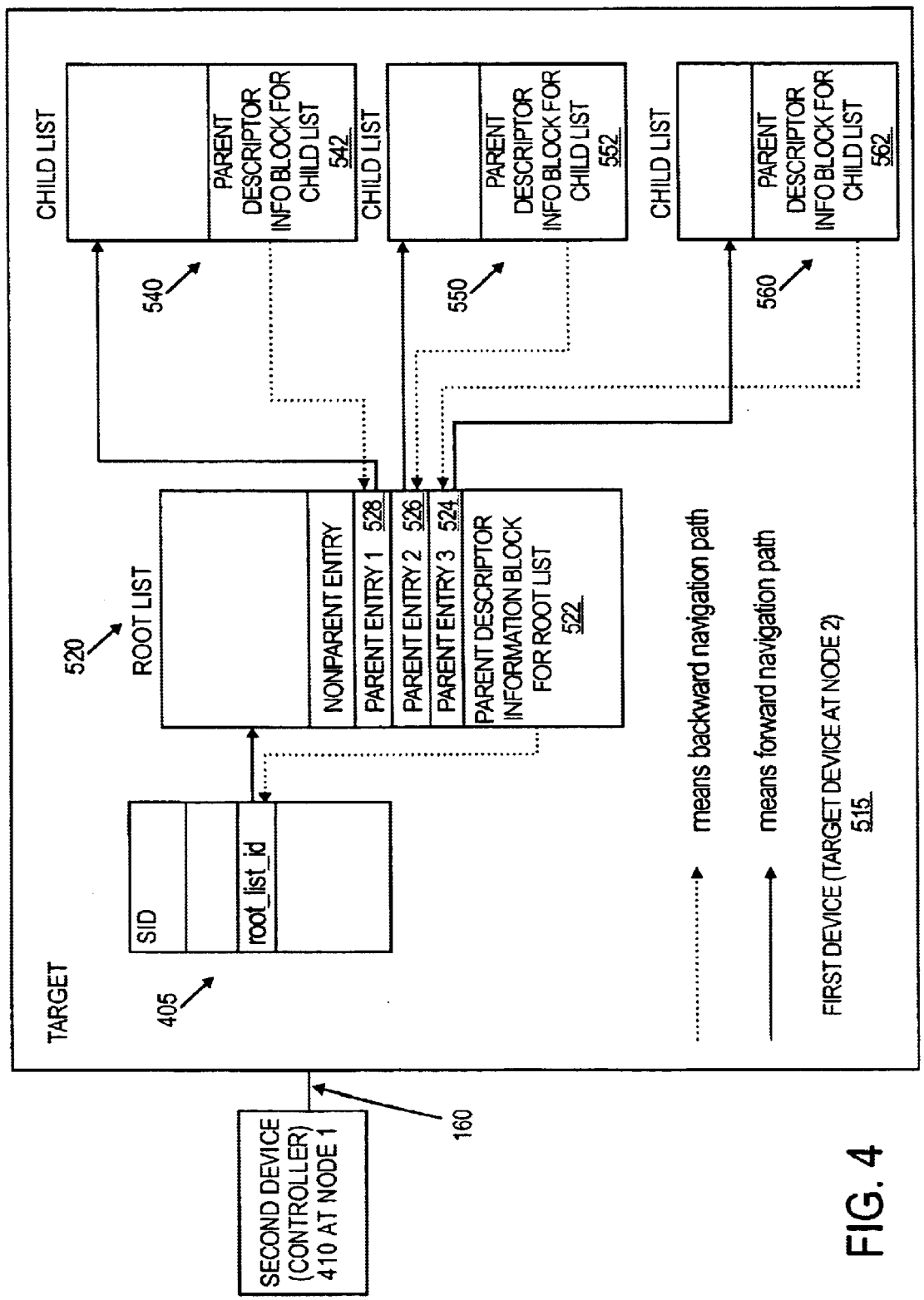
FIG. 4 illustrates in one embodiment a descriptor hierarchy conceptual diagram.

FIG. 4 illustrates one embodiment of navigating a descriptor hierarchy in a forward direction and a backward direction. Controller 410 is connected to target device 515 having a plurality of descriptors (405, 520, 540, 550, and 560). In this embodiment, a descriptor specifier having a list identifier and an object identifier is required.

To navigate a descriptor hierarchy, backwards from, for example, a root list, refer to position 522. At position 522 of descriptor 520, the parent descriptor information block refers to SID 405 as its parent. While the root list is open, controller 410 reads parent descriptor information block 522 to determine that SID 405 is the parent and root_list_ID is its list_ID. Additionally, child lists for descriptors 540, 550, and 560 may be opened by reading entries in the root list.

There is a parent descriptor information block within descriptors 540, 550, and 560 that refer to the root list. For instance, parent descriptor information block 542 for a child list of descriptor 540 refers to parent entry 1 528 of descriptor 520, parent descriptor information block 552 for a child list of descriptor 550 refers to parent entry 2 526 of descriptor 520, parent descriptor information block 562 for a child list of descriptor 560 refers to parent entry 3 524 of descriptor 520. While a child list is open, controller 410 reads a parent descriptor information block for the particular child list to determine which specific list and entry in the descriptor hierarchy is its parent.

Figure 6:
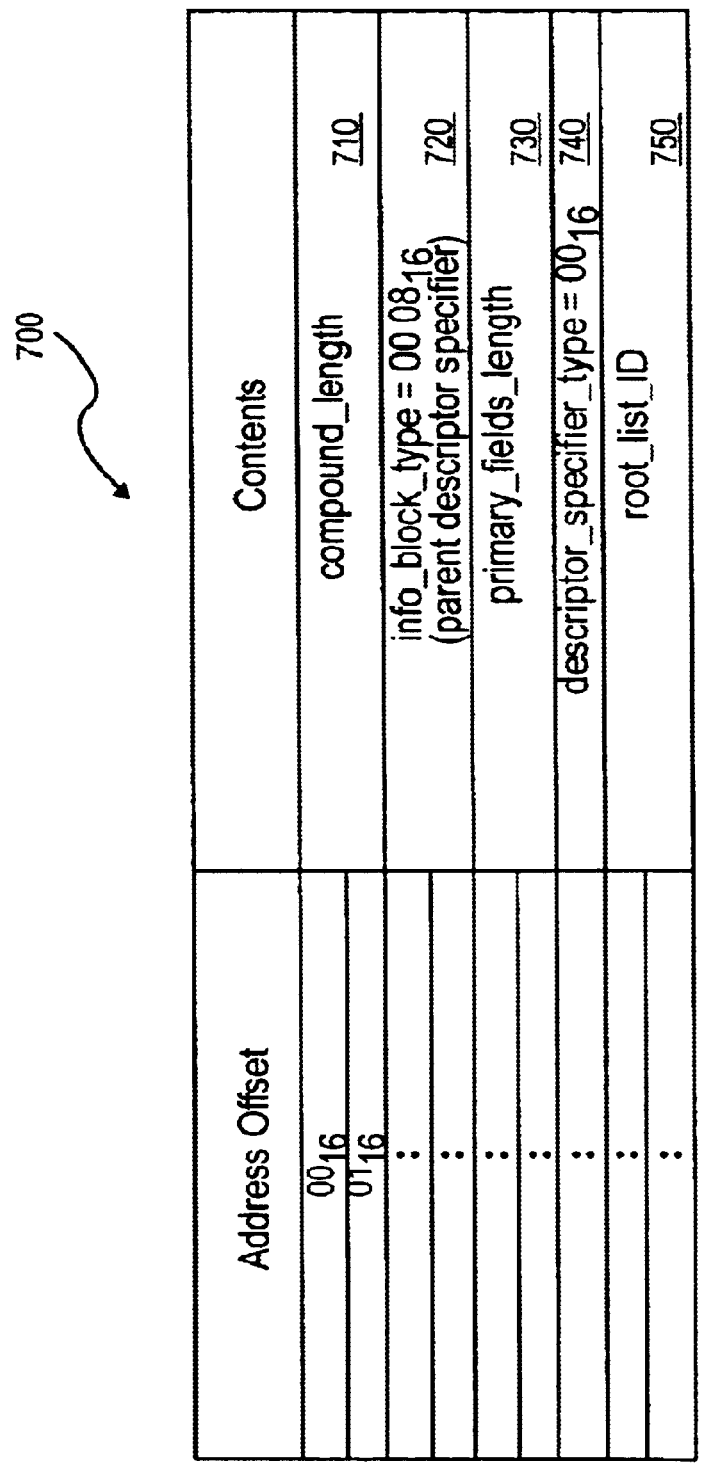
FIG. 6 illustrates in one embodiment, a parent descriptor info block for a root list that would be placed in the root list descriptor's extended information area.

While navigating descriptors, controller 410 may use descriptors such as descriptors 520 and 540 and move in a backward direction following, for example, its original path of descriptors 540 to 520. Typical techniques allow controller 410 to move in a backward direction provided that controller 410 keeps track of the descriptor that controller 420 previously navigated. A controller tracks its original path by storing the list identifier and the parent entry identifier of the list descriptors within the memory of the controller. To avoid tracking the navigation of the descriptors, techniques of the invention embed information regarding a parent list (also referred to herein as the first list) within the list descriptor as shown in FIGS. 5 through 7. This allows the controller to navigate the descriptors without storing the identifiers of the list entry descriptor and parent entry descriptors within the memory of controller 410.

FIG. 5 illustrates the parent descriptor information block 600 for a child list that may be placed in the child list descriptor's extended information area. More particularly, the parent descriptor information block is placed at position 810 in list descriptor 800 as in FIG. 7 by a CREATE DESCRIPTOR command. Descriptor information block 600 also includes list identifier 650 and object identifier 660 which are used by the controller for accessing the parent entry. Fields such as compound_length 610, info_block_type 620, primary_fields_length 630, and descriptor_specifier_type 640 are general info block fields of the parent descriptor info block 600. The parent descriptor info block 600 may be placed in the extended information field (i.e. extended_information field) 810 shown in FIG. 7.

FIG 6 illustrates in one embodiment, a parent descriptor info block 700 for a root list placed in the root list descriptor extended information. The parent descriptor info block is placed at 810 of list descriptor 800 shown in FIG. 7. The parent descriptor info block 700 includes root_list_identifier 750 used by the controller for accessing the parent entry. Fields such as compound_length 710, info_block_type 720, primary_fields_length 730 and descriptor specifier type 740, are general info block fields of the parent descriptor info block 700. One embodiment embeds information about the parent list within the list descriptor.

FIG. 7 illustrates the descriptor 800 with the extended information field. This descriptor structure applies to both root lists and child lists. When a controller moves backwards in a descriptor hierarchy, the controller can read information in the extended information field 810 to determine the descriptor_specifier for opening its parent entry or SID. Therefore, controller 410, using the descriptor_specifier and the parent descriptor 600, may navigate in a forward or a backward direction in the descriptor hierarchy without storing information about the locations of the descriptors that the controller previously visited.

Figure 8:
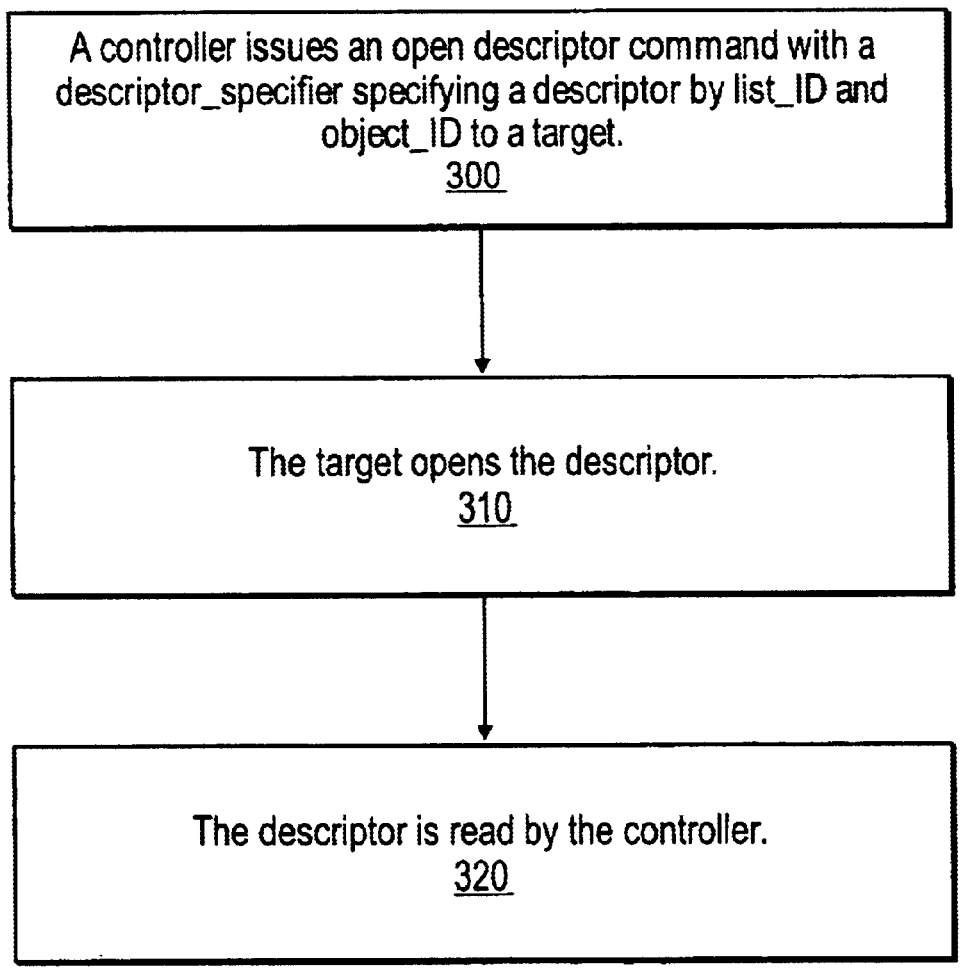
FIG. 8 is a flow diagram of one embodiment related to using the new descriptor specifier in a command to access a descriptor.

FIG. 8 is a flow diagram of one embodiment for using the new specifier for accessing an entry descriptor. At block 300, a controller issues an OPEN DESCRIPTOR command with a descriptor_specifier specifying a descriptor by a list identifier (i.e. list_ID) and an object identifier (i.e. object_ID). At block 310, a target opens the descriptor. At block 320, the descriptor is read by the controller using the same descriptor_specifier.

Figure 10:
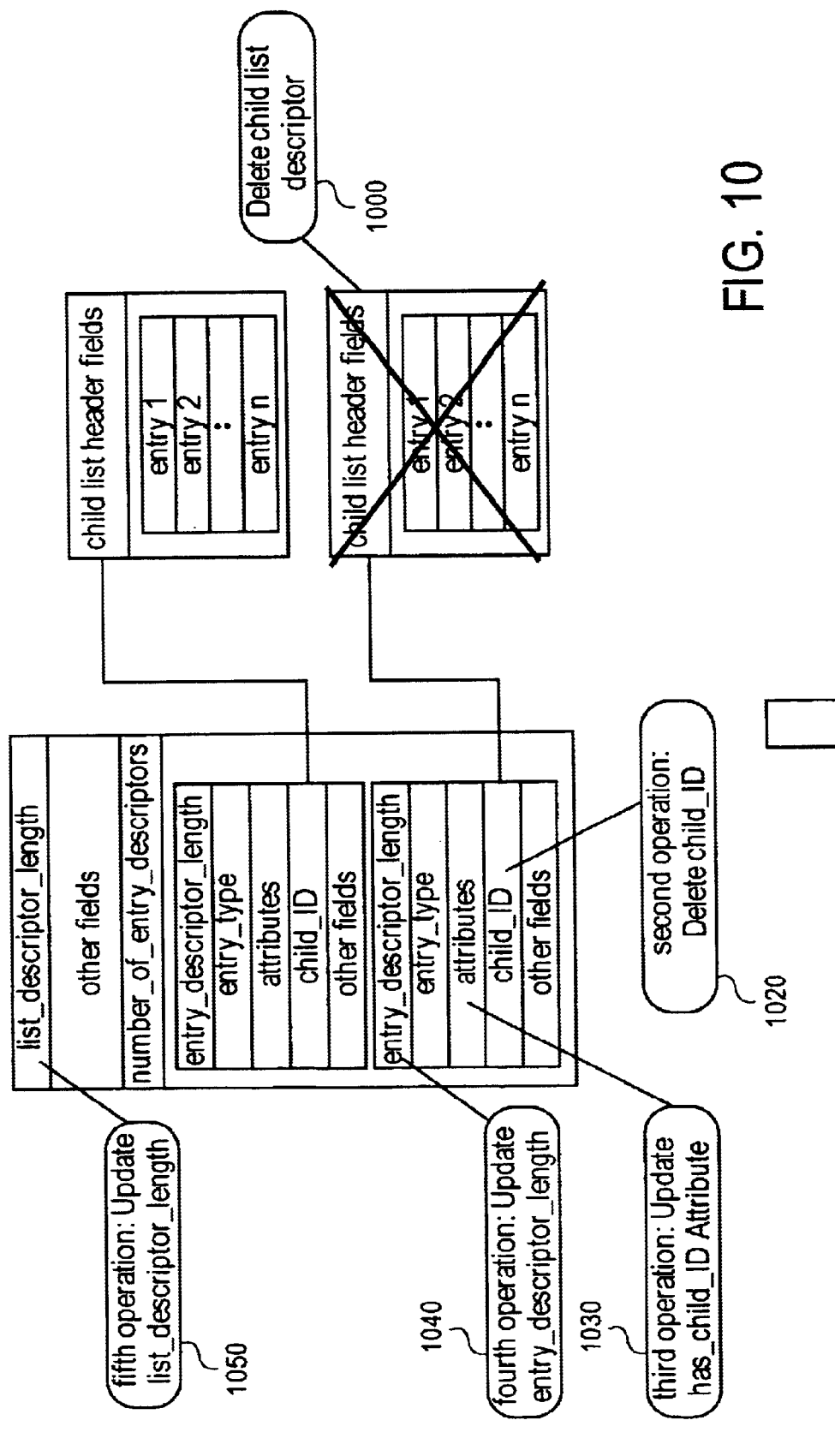
FIG. 10 illustrates in one embodiment of deleting a child list by deleting the child list in the descriptor specifier.
Figure 10:
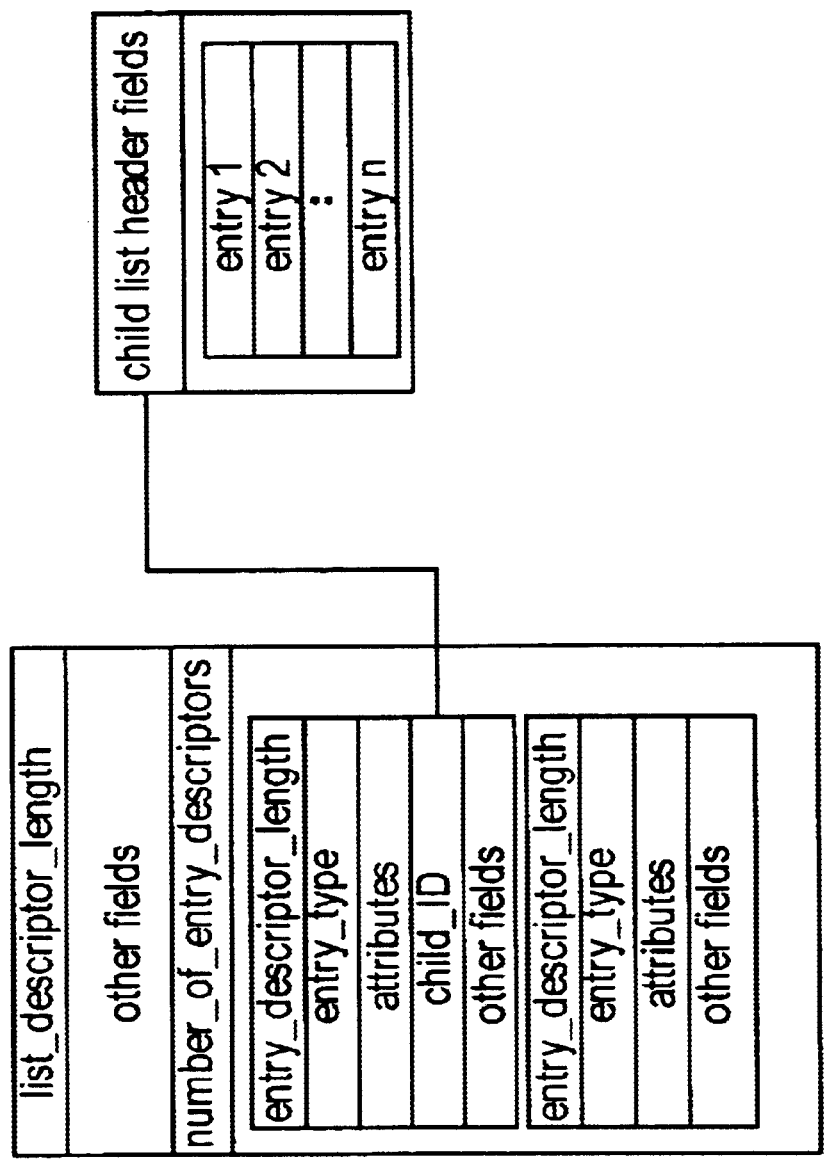

FIG. 9 is a flow diagram of one embodiment for embedding information about the parent entry such as for a child list or SID such as for a root list within the list descriptor for the purposes of navigating descriptors in a backwards direction. At block 910, a descriptor specifier for the parent descriptor is placed at the end of the root list descriptor (e.g., extended_information field) or the child list descriptor during a CREATE DESCRIPTOR command. The descriptor specifier may specify an entry by a list identifier and an object identifier. The root list has a beginning (also referred to herein as a first position) and an end (also referred to herein as a second position). The new descriptor specifier is placed in the second position for the root list. The child list also has a beginning position (referred to herein as a third position) and an end position (referred to herein as a fourth position). The descriptor specifier is placed in the fourth position of the child list. At block 920, the parent descriptor, located in the extended information field of the child list descriptor, is used to determine the descriptor specifier of its parent entry or the SID if the controller is currently reading a root list. At block 930, an OPEN DESCRIPTOR command is issued with the descriptor_specifier for opening its parent entry (or SID) by a controller. Thus, the controller navigates backward in the descriptor hierarchy, FIGS. 10–16 illustrate methods for deleting a child list descriptor in a descriptor hierarchy BY USING THE NEW delete descriptor command illustrated in FIG. 14. FIG. 10 illustrates one embodiment relating to deleting a child list by using the child list in the descriptor_specifier. At block 1000, a child list descriptor is deleted. At block 1020, a child_ID is then deleted which is due to the child list descriptor at block 1000 being deleted. At block 1030, has_child_ID attribute is updated to reflect that the child ID field has been deleted. The has_child_ID attribute should be updated whenever the child_ID is deleted because the has_child attribute, prior to deletion, is set to "1" which implies the child_ID field exists. When the child_ID field does not exist, the has_child_ID attribute should be set to "0". The value in the has_child_ID attribute indicates to another device such as a controller whether a child list exists. At block 1040, an entry_descriptor_length is updated to indicate that the entry_descriptor_length is shorter after the child ID field has been deleted. At block 1050, a list_descriptor_length is updated to also reflect that the list_descriptor_length has been shortened to indicate that the child ID field has been deleted. It will be appreciated that the X represents a target descriptor in a descriptor_specifier.

Figure 11:
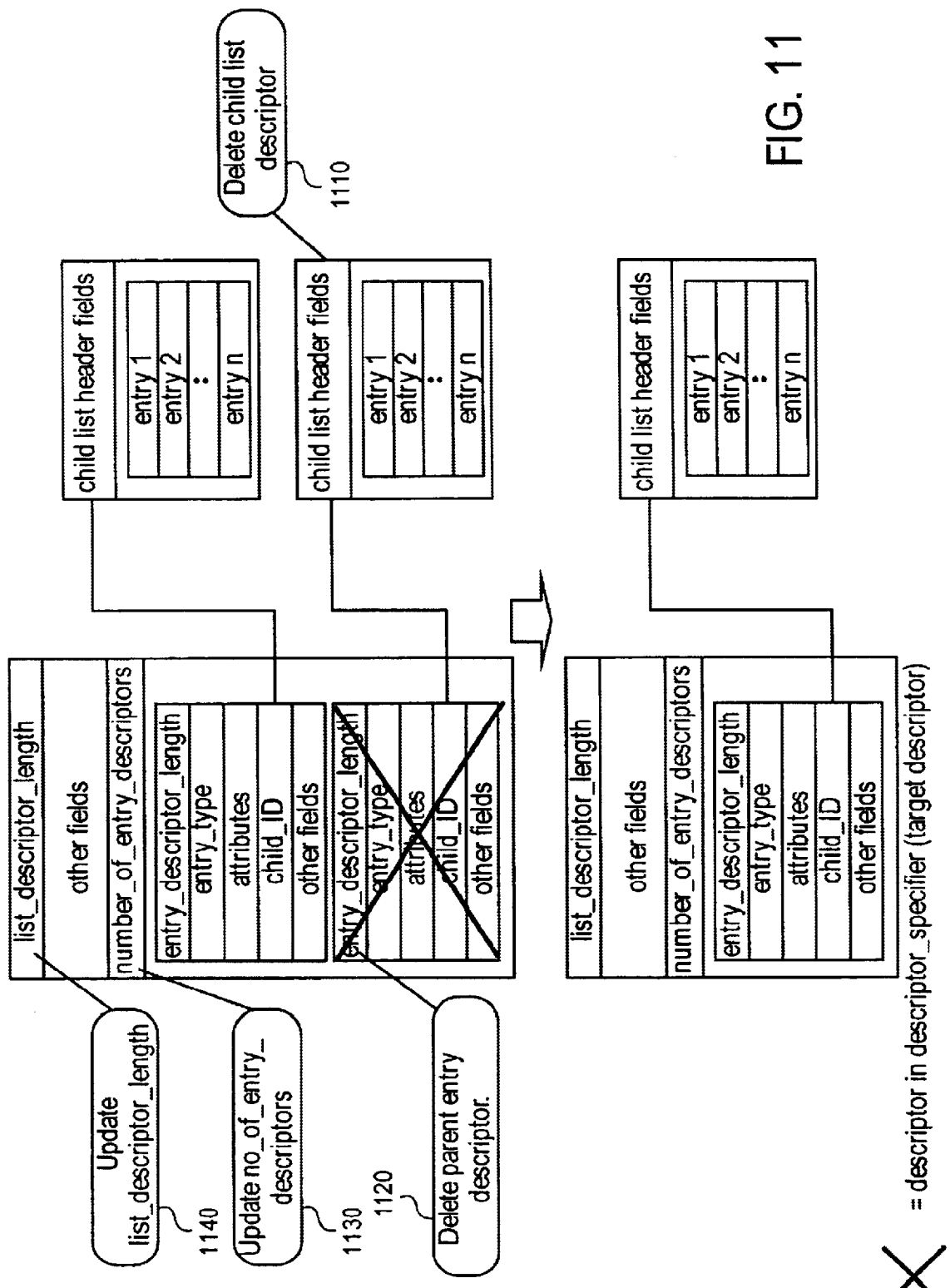
FIG. 11 illustrates a child list being deleted by deleting the parent entry descriptor in the descriptor_specifier.

FIG. 11 illustrates a child list being deleted by deleting the parent entry descriptor. At block 1110, a child list descriptor is first deleted by using the new DELETE DESCRIPTOR COMMAND illustrated in FIG. 14. At block 1120, the parent entry descriptor is deleted. At block 1130, the no_of_entry_descriptors field is updated to reflect that there is one less entry descriptor in the list. At 1140, the list_descriptor_length is updated to reflect that the list_descriptor_length has been shortened.

Figure 12:
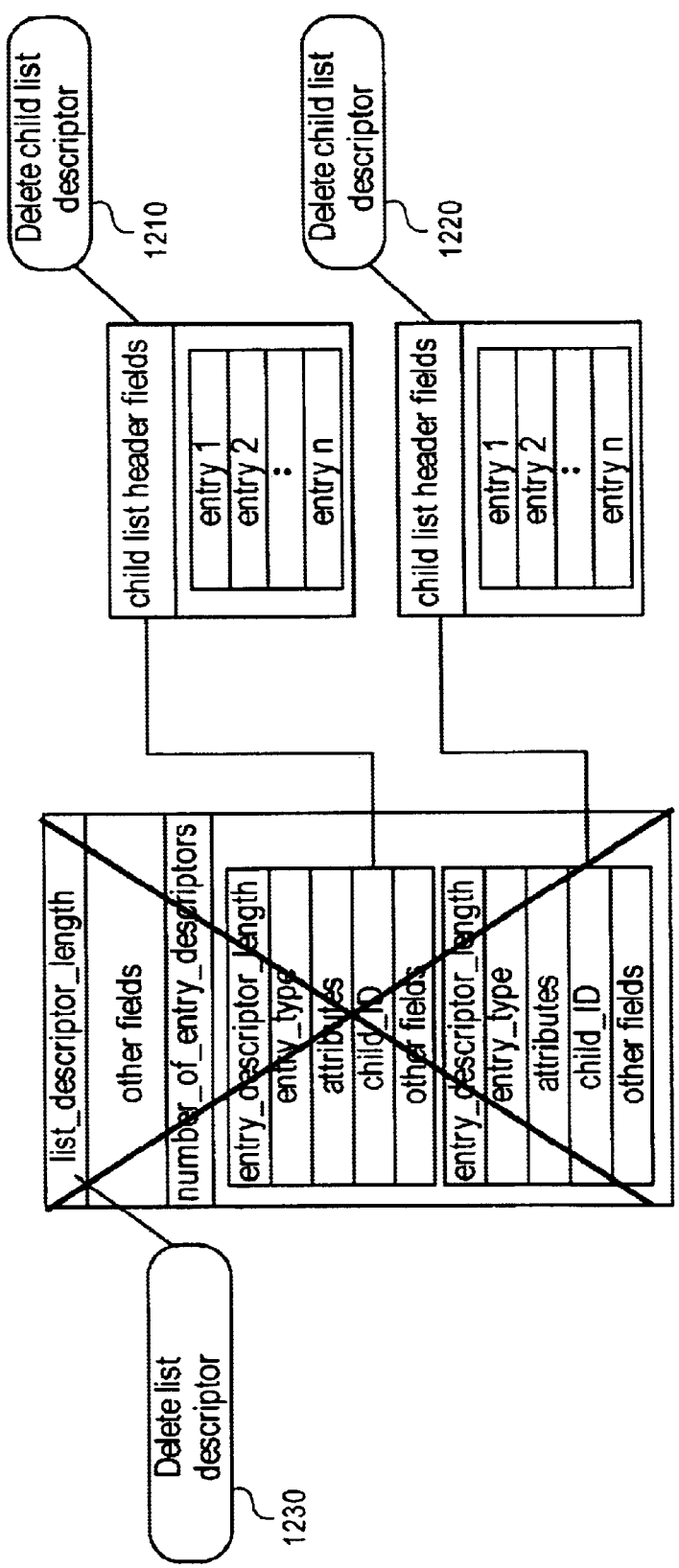
FIG. 12 illustrates deleting a list and its child lists by deleting the list descriptor specified in the descriptor specifier.

FIG. 12 illustrates child lists being deleted by using the parent entry descriptor's list in the descriptor_specifier. At block 1210, a child list descriptor is deleted. At block 1220, a second child list descriptor is deleted. At block 1230, a list descriptor, which is the target descriptor, is deleted.

It will be appreciated that an AV/C subunit may only delete leaf lists. Leaf lists are those lists that exist at the lowest level of the hierarchy such as child list descriptors (1210, 1220). This is due to leaf lists containing entry descriptors without child lists. If a controller is to delete a particular list at a random location in the hierarchy, a subunit shell is required to search for all available lists to delete that which exists under that list. Thereafter, starting from the first leaf list, the subunit begins deleting. As the leaf lists are deleted, their parent lists become leaf lists and are then capable of being deleted.

It will be appreciated that when a root list is deleted, each individual delete operation may involve one or more descriptors as illustrated at blocks 1210 and 1220 of FIG. 12.

Figure 13:
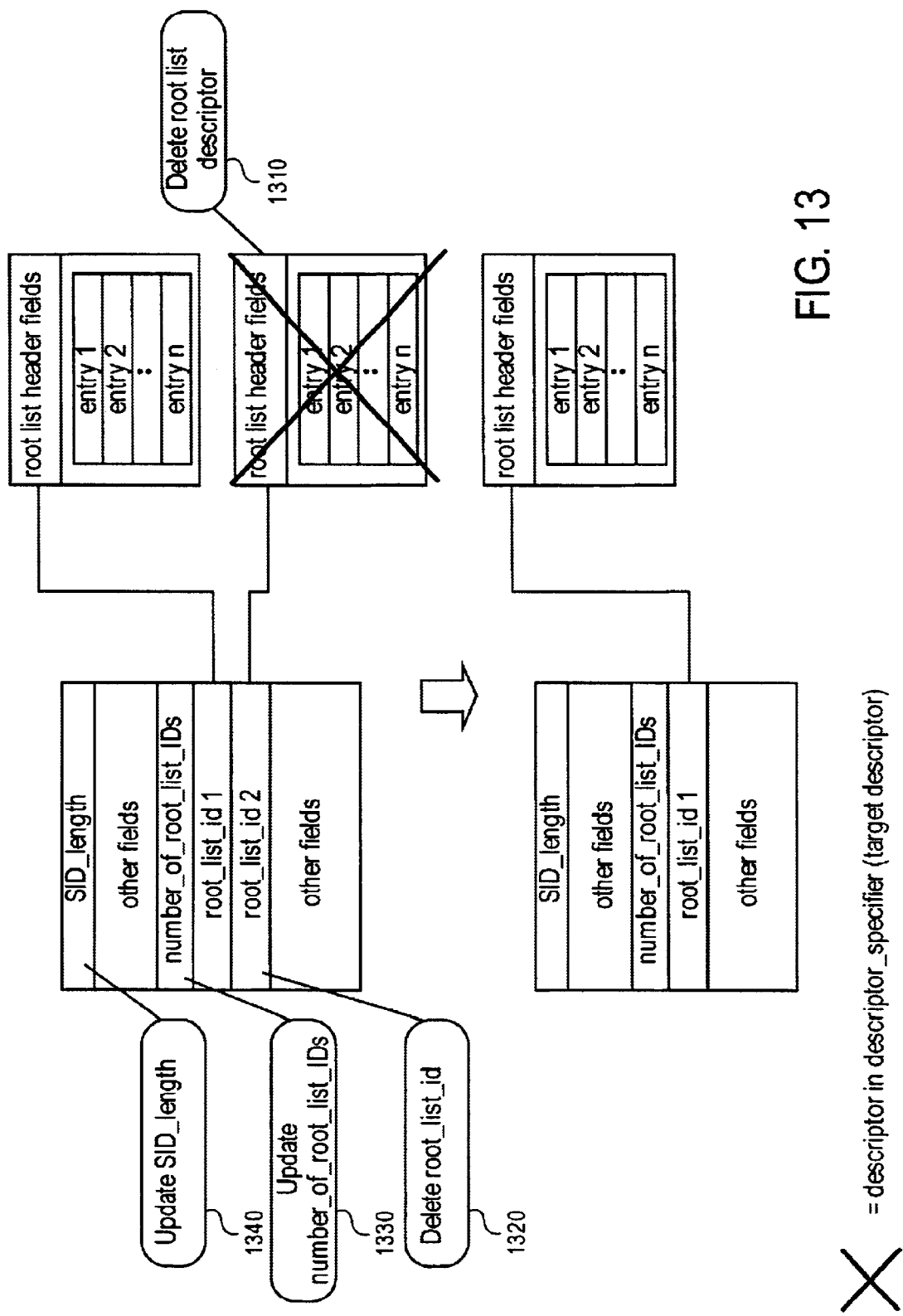
FIG. 13 illustrates a root list being deleted.
Figure 14:
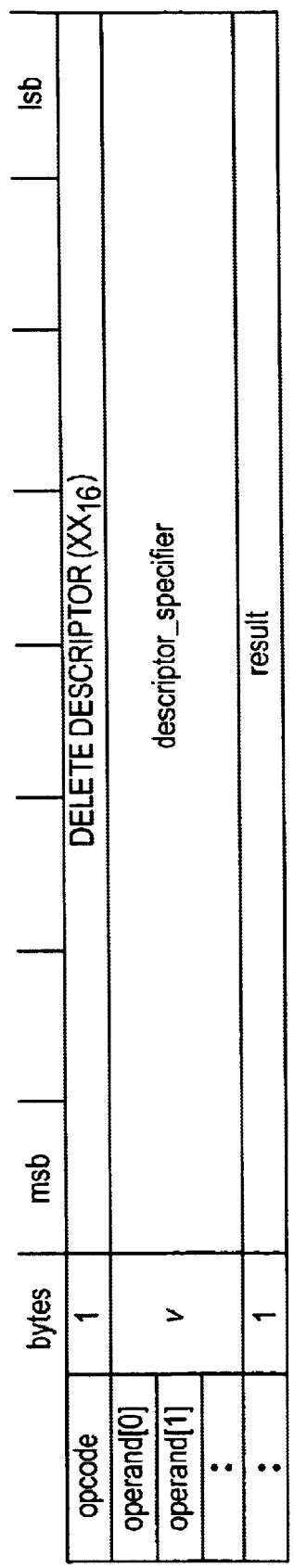
FIG. 14 illustrates a new DELETE DESCRIPTOR command that may be used to delete various descriptors.

In FIG. 13, at block 1310, a root list descriptor (which is also a leaf) is deleted by using the new DELETE DESCRIPTOR COMMAND illustrated in FIG. 14. At block 1320, the root_list_ID is deleted. At block 1330, the number_of_root_list_IDs field is updated to reflect the deletion of the root list ID field. At block 1340, the SID_length is updated since the SID has shortened.

FIG. 14 illustrates the new DELETE DESCRIPTOR-control command that may be used to delete various descriptors as described herein. The descriptor_specifier can specify a root list, child list, or an entry in which each of these may be deleted. When deleting entries, the DELETE DESCRIPTOR command should be issued on a descriptor opened by an AV/C controller. The entry may then be deleted.

When deleting lists such as a root list or a child list, the DELETE DESCRIPTOR command should be issued on a closed descriptor to prevent any access disruptions to other controllers. The result field describes the result of the delete operation. The result field is set to $00_{16}$ on input to show that the delete operation has occurred successfully. This value of the result field can change in the response frame as shown in Table I.

TABLE I

| | Value of Result Field. |
|---|---|
| Value of result | meaning |
| $00_{16}$ | The target descriptor and all its child lists (if any) were deleted successfully. |
| $01_{16}$ | The target descriptor and some of its child lists were not deleted. Inspect the fields below in the command to determine which ones and the node IDs of the controllers that opened them. |
| All others | Reserved (ie., values are not presently defined at this time, but these values may be defined in the future.) |

The DELETE DESCRIPTOR command, when issued on a non-leaf descriptor, attempts a cascade delete process as described above. If any descriptors are open for a read operation, then those descriptors should be force closed using a typical close command and thereafter deleted. If all the descriptors in the hierarchy are deleted, then the target should return an ACCEPTED response frame that should be the same as the command frame. If any descriptor cannot be deleted either directly or indirectly because its descriptor or related descriptors are open for a write operation, the command should return a REJECTED response. The DELETE DESCRIPTOR response frame is provided in FIG. 15. The number_of_undeleted_descriptors fields are filled with the number of undeleted list descriptors resulting from the DELETE DESCRIPTOR control command. The number of undeleted_descriptors fields do not contain information about entry descriptors.

The length of each descriptor_specifier is known by each descriptor_specifier type. If a descriptor has multiple open entries, then each of the descriptor specifiers and node_IDS should be returned. For descriptors that are not open and cannot be deleted because their parent or children lists are open, a node_ID of 00 $00_{16}$ should be returned to indicate that they are not open. The length of each opener_node_ID should be two, since node_IDs are always two bytes in length.

Figure 16:
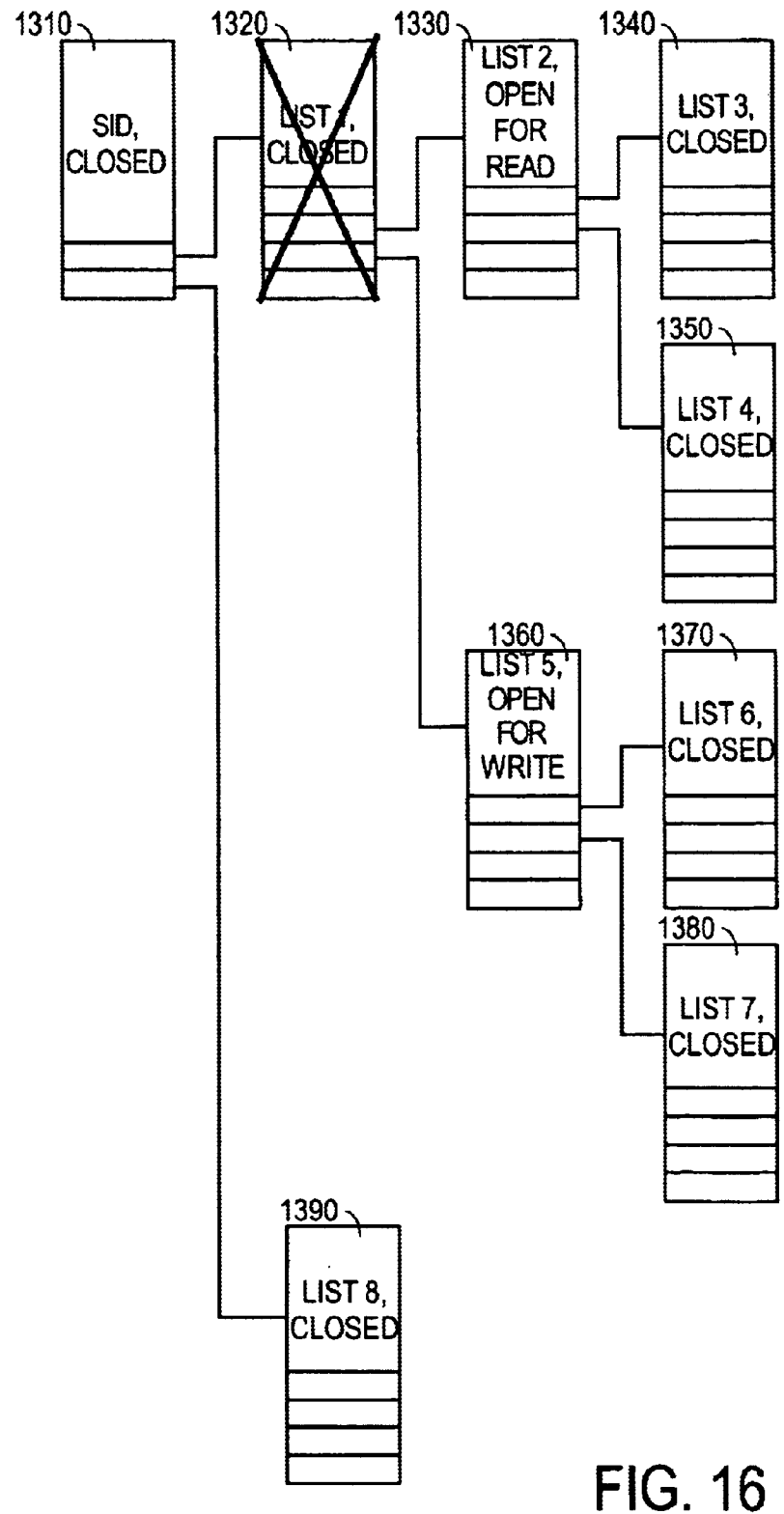
FIG. 16 illustrates a descriptor being deleted when another descriptor in the descriptor hierarchy is open for a write operation and another descriptor is open for a read operation.

FIG. 16 illustrates descriptor hierarchy being deleted when one descriptor within a hierarchy is open for a write operation and one descriptor is open for a read. If the AV/C controller is unable to delete the opened_for_write descriptors, the AV/C controller may issue an open descriptor NOTIFY command for each open descriptor to be notified when the descriptor is finally closed. The AV/C controller may then reissue the same DELETE DESCRIPTOR command.

Figure 17:
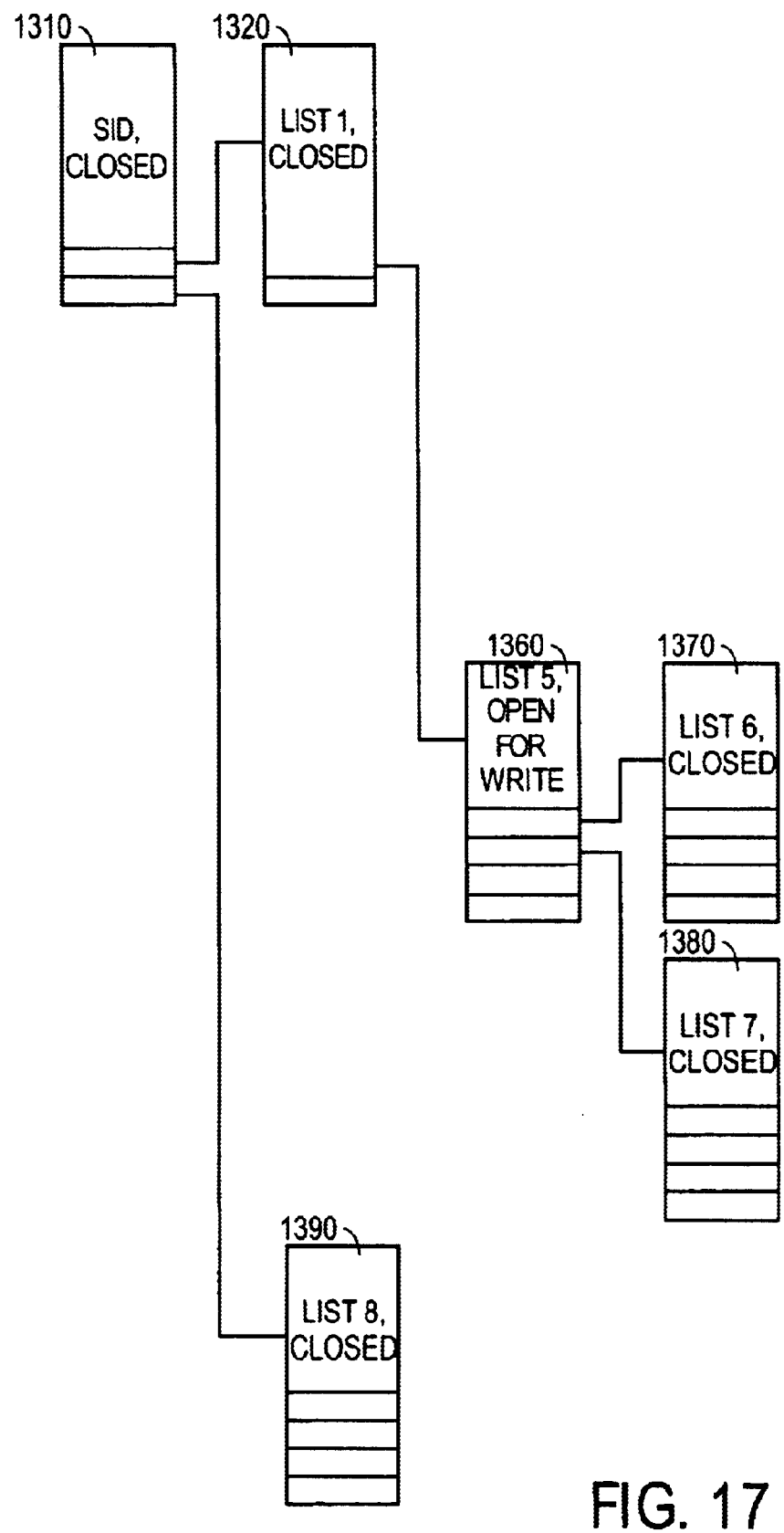
FIG. 17 illustrates the descriptor hierarchy after descriptors in the descriptor hierarchy of FIG. 16 have been deleted.

At block 1330, list 2 is open for a read operation. Consequently, list 2 at 1330 is force closed. List descriptor 1340 is then deleted and the parent entry is updated. Descriptor 1350 is also deleted and the parent entry updated. Leaf list descriptors 1370 and 1380 are not deleted because its parent entry inside list 1360 is access protected. However, root list descriptor 1330 is deleted and the parent entry updated to reflect the deletion of the root list. List descriptor 1360, which is open for a write operation, is also access protected and therefore it is not deleted. Additionally, root list descriptor 1320 keeps all the entries accept the entry with the deleted child list. Finally, SID 1310 is not deleted. This provides a final result of descriptors that remain in the descriptor hierarchy as shown in FIG. 17. FIG. 17 illustrates that lists 1330, 1340, and 1350 have been deleted from the descriptor hierarchy after the cascade delete process.

In the preceding detailed description, the invention is described with reference to specific embodiments thereof. It will, however, be evident that various modifications and changes may be made thereto without departing from the broader spirit and scope of the invention as set forth in the cairns. The specification and drawings are, accordingly, to be regarded in an illustrative rather than a restrictive sense.

What is claimed is:

1. A system comprising:
    a serial bus to connect devices;
    the serial bus connected to a first device and a second device; and
    a data structure within the first device, the data structure comprising a hierarchy of descriptors, each descriptor identifiable by a descriptor specifier consisting of a list identifier and an object identifier, wherein an extended information field in a second list contains information for a first list and the second device accesses the extended_information field to move backwards in the hierarchy of descriptors using a command containing the descriptor specifier for one of a first list descriptor and a second list descriptor.

2. The system of claim 1, wherein an unambiguous specification of any descriptor is made through a corresponding descriptor specifier.

3. The system of claim 1, wherein the second list has a beginning and an end; and
    the information is placed at the end of the second list.

4. A method comprising:
    coupling a first device and a second device to a serial bus;
    placing into a data structure a descriptor specifier which specifies an entry, the descriptor specifier consisting of a list identifier and an object identifier and the data structure comprising a hierarchy of descriptors as entries, wherein the descriptor specifier is placed in an extended_information field; and
    reading the information from the extended_information field to move backwards in the hierarchy.

5. The method of claim 4, further comprising:
    opening the data structure by the first device; and
    reading at least one entry in the data structure by the second device.

6. The method of claim 4, comprising:
    embedding information about a parent entry within a child list descriptor.

7. A method comprising:
    using a descriptor specifier consisting of a list ID and an object ID to access an entry in a descriptor hierarchy;
    placing a parent descriptor info block in an extended information field; and
    accessing the extended_information field to move backwards in the descriptor hierarchy.

8. The method of claim 7, further comprising:
    embedding information about a parent entry within a list descriptor.

9. The method of claim 7, further comprising:
    placing information about a parent entry in a child list.

10. A method comprising:
    embedding a parent descriptor info block within a list descriptor, the parent descriptor info block comprising a descriptor specifier consisting of a list identifier and an object identifier;
    placing the descriptor specifier for the parent descriptor in one of a root list descriptor and a child list descriptor;
    using the descriptor specifier in a descriptor command for opening the parent entry; and
    navigating descriptors in a descriptor hierarchy using the descriptor specifiers, wherein navigating is in a backward direction.

11. The method of claim 10, wherein the root list descriptor has a first position and a second position; and
    the descriptor specifier is placed at the second position.

12. The method of claim 10, wherein the child list descriptor has a third position and a fourth position; and
    the descriptor specifier is placed at the fourth position.

13. A method comprising:
    using a delete descriptor command to delete a child list descriptor in a descriptor hierarchy, the delete descriptor command configured to also update data in a corresponding parent descriptor and in a corresponding parent list descriptor and delete one of a root list, a child list, and an entry when the child list descriptor is deleted.

14. The method of claim 13, further comprising:
    deleting a child_ID in the descriptor hierarchy.

15. The method of claim 14, further comprising:
    updating has_child_ID attributes.

16. The method of claim 15, further comprising:
    updating entry_descriptor_length.

17. The method of claim 16, further comprising:
    updating list_descriptor_length.

18. The method of claim 17, further comprising:
    deleting the child list descriptor in the descriptor hierarchy.

19. The method of claim 18, further comprising:
    deleting the corresponding parent descriptor.

20. The method of claim 19, further comprising:
    updating no_of_entry descriptors.

21. The method of claim 20, further comprising:
    updating a list_descriptor_length.

22. The method of claim 21, further comprising:
    deleting a first child list descriptor in the descriptor hierarchy.

23. The method of claim 22, further comprising:
    deleting a second list descriptor.

24. The method of claim 23, further comprising:
    deleting a list descriptor.

25. A system comprising:

a serial bus to connect devices;

the serial bus connected to a first device and a second device; and a data structure within the first device, the data structure comprising a hierarchy of descriptors containing a child list descriptor, wherein the second device uses a delete descriptor command to delete the child list descriptor, the delete descriptor command configured to also delete the child_ID and one of a root list, a child list, and an entry, and update one of a has_child_ID attribute, an entry_descriptor_length, and the list _descriptor_ length when the child list descriptor is deleted.

26. A method of embedding information about a root_list_ID within a root list descriptor comprising:

reading an extended information field in the root list descriptor by a controller, wherein accessing the extended_information field allows the controller to move backwards in a data structure hierarchy.

* * * * *